United States Patent
Duan et al.

(10) Patent No.: US 6,529,865 B1
(45) Date of Patent: Mar. 4, 2003

(54) SYSTEM AND METHOD TO COMPILE INSTRUCTIONS TO MANIPULATE LINGUISTIC STRUCTURES INTO SEPARATE FUNCTIONS

(75) Inventors: Lei Duan, Cupertino, CA (US); Alexander Franz, Palo Alto, CA (US); Keiko Horiguchi, Palo Alto, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 0 days.

(21) Appl. No.: 09/419,533

(22) Filed: Oct. 18, 1999

(51) Int. Cl.[7] .............................................. G06F 17/27
(52) U.S. Cl. ......................................................... 704/9
(58) Field of Search ................... 704/1, 9, 10; 707/530, 707/531, 532; 717/1, 4, 8

(56) References Cited

U.S. PATENT DOCUMENTS

| | | | |
|---|---|---|---|
| 4,974,191 A | 11/1990 | Amirgbodsi et al. | 364/900 |
| 5,033,087 A | 7/1991 | Bahl et al. | |
| 5,083,268 A * | 1/1992 | Hemphill et al. | 704/9 |
| 5,088,038 A | 2/1992 | Tanaka et al. | 364/419 |
| 5,095,432 A * | 3/1992 | Reed | 704/9 |
| 5,418,717 A | 5/1995 | Su et al. | 364/419.08 |
| 5,426,583 A | 6/1995 | De Mendiil | 364/419.08 |
| 5,510,981 A | 4/1996 | Berger et al. | 364/419.02 |
| 5,528,491 A | 6/1996 | Kuno et al. | 364/419.08 |
| 5,535,120 A | 7/1996 | Chong et al. | 364/419.02 |
| 5,659,765 A | 8/1997 | Nii | 395/754 |
| 5,677,835 A | 10/1997 | Carbonell et al. | 364/419.02 |
| 5,768,603 A | 6/1998 | Brown et al. | 395/759 |
| 5,799,268 A | 8/1998 | Boguraev | 704/9 |
| 5,806,021 A | 9/1998 | Chen et al. | 704/9 |
| 5,864,788 A | 1/1999 | Kutsumi et al. | 704/2 |
| 5,873,056 A | 2/1999 | Liddy et al. | 704/9 |
| 5,907,821 A | 5/1999 | Kaji et al. | 704/4 |
| 5,963,894 A | 10/1999 | Richardson et al. | 704/9 |
| 5,966,686 A * | 10/1999 | Heidorn et al. | 704/9 |
| 5,983,169 A | 11/1999 | Kozma | 704/2 |
| 6,161,083 A | 12/2000 | Franz et al. | 704/4 |
| 6,173,441 B1 * | 1/2001 | Klein | 717/5 |
| 6,212,500 B1 | 4/2001 | Köhler | |
| 6,230,153 B1 | 5/2001 | Howard et al. | |
| 6,243,669 B1 | 6/2001 | Horiguchi et al. | |
| 6,330,530 B1 | 12/2001 | Horiguchi et al. | |

FOREIGN PATENT DOCUMENTS

EP  805 403 A2  5/1997

OTHER PUBLICATIONS

PCT Search Report dated Apr. 4, 2001, 4 pages.
PCT Search Report dated Feb. 22, 2001, 5 pages.
PCT Search Report dated Jan. 29, 2001, 6 pages.
PCT Search Report dated Jan. 31, 2001, 5 pages.

* cited by examiner

*Primary Examiner*—Patrick N. Edouard
(74) *Attorney, Agent, or Firm*—Blakely, Sokoloff, Taylor & Zafman LLP

(57) ABSTRACT

A grammar programming language ("GPL") compiler compiles each rule in a natural language grammar into a separate function that can be invoked by a translation system to apply the rule to a representation of a natural language expression. The GPL compiler can output the functions for the rules as source code for a standard computer programming language to be further compiled into object code that can be directly executed by a computer processor. The GPL compiler can also generate special functions for each rule to enable multi-layered operations on the representations and to handle the processing of representations of ambiguous expressions.

30 Claims, 7 Drawing Sheets

SYSTEM AND METHOD TO COMPILE INSTRUCTIONS TO MANIPULATE LINGUISTIC STRUCTURES INTO SEPARATE FUNCTIONS

FIELD OF THE INVENTION

This invention relates generally to natural language translation, and more particularly to compiling grammars used to translate a natural language.

BACKGROUND OF THE INVENTION

With the continuing growth of multinational business dealings where the global economy brings together business people of all nationalities and with the ease and frequency of today's travel between countries, the demand for a machine-aided interpersonal communication system that provides accurate near real-time language translation is a compelling need. This system would relieve users of the need to possess specialized linguistic or translation knowledge.

A typical language translation system functions by using natural language processing. Natural language processing is generally concerned with the attempt to recognize a large pattern or sentence by decomposing it into small sub-patterns according to linguistic rules. A natural language processing system uses considerable knowledge about the structure of the language, including what the words are, how words combine to form sentences, what the words mean, and how word meanings contribute to sentence meanings.

Morphological knowledge concerns how words are constructed from more basic units called morphemes. Syntactic knowledge concerns how words can be put together to form correct sentences and determines what structural role each word plays in the sentence and what phrases are subparts of what other phrases. Typical syntactic representations of language are based on the notion of context-free grammars, which represent sentence structure in terms of what phrases are subparts of other phrases. This syntactic information is often presented in a tree form. Semantic knowledge concerns what words mean and how these meanings combine in sentences to form sentence meanings. This is the study of context-independent meaning—the meaning a sentence has regardless of the context in which it is used.

Natural language processing systems further include interpretation processes that map from one representation to the other. For instance, the process that maps a sentence to its syntactic structure and/or logical form is called parsing, and it is performed by a component called a parser. The parser uses knowledge about word and word meaning, the lexicon, and a set of rules defining the legal structures, the grammar, in order to assign a syntactic structure and a logical form to an input sentence.

Formally, a context-free grammar of a language is a four-tuple containing nonterminal vocabularies, terminal vocabularies, a finite set of production rules, and a starting symbol for all productions. The nonterminal and terminal vocabularies are disjunctive. The set of terminal symbols is called the vocabulary of the language.

The typical natural language processor, however, has realized only limited success because these processors require complex operations to manipulate the representations of the expressions. The creation of such operations using existing methodologies is tedious and the inflexibility of such methodologies limits the kinds of operations that can be used, resulting in inefficiencies in the translation process.

SUMMARY OF THE INVENTION

The above-mentioned shortcomings, disadvantages and problems are addressed by the present invention, which will be understood by reading and studying the following specification.

A grammar programming language ("GPL") compiler enables a flexible programming language for creating natural language grammars by it hiding much of the complexities of manipulating representations of natural language expressions. Each rule in a natural language grammar is compiled by the GPL into a separate function that can be invoked by a translation system to apply the rule to the representation. Furthermore, the GPL compiler can output the functions for the rules as source code for a standard computer programming language to be further compiled into object code that can be directly executed by a computer processor, thus increasing the speed of translating a natural language.

In one aspect, the GPL compiler generates expansion and combination functions for each rule so that the programmer of the natural language grammar does not have to be concerned with determining when a rule can be applied to the representation of an ambiguous expression, making the task of creating a grammar simpler. Furthermore, the GPL compiler creates expansion and combination functions to more efficiently and quickly perform the translation of such ambiguous expressions.

In another aspect, the GPL compiler handles nested GPL statements, allowing the programmer to easily define multi-layered operations to be carried out on the representations.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

BRIEF DESCRIPTION OF THE DRAWINGS

FIGS. 2b, 2c, and 2d are diagrams of structures used by the embodiment of the natural language translation system shown in FIG. 2a;

FIG. 3 is a diagram of one embodiment of a compilation process suitable for use with the natural language translation system shown in FIG. 2a;

DETAILED DESCRIPTION OF THE INVENTION

Figure 1:
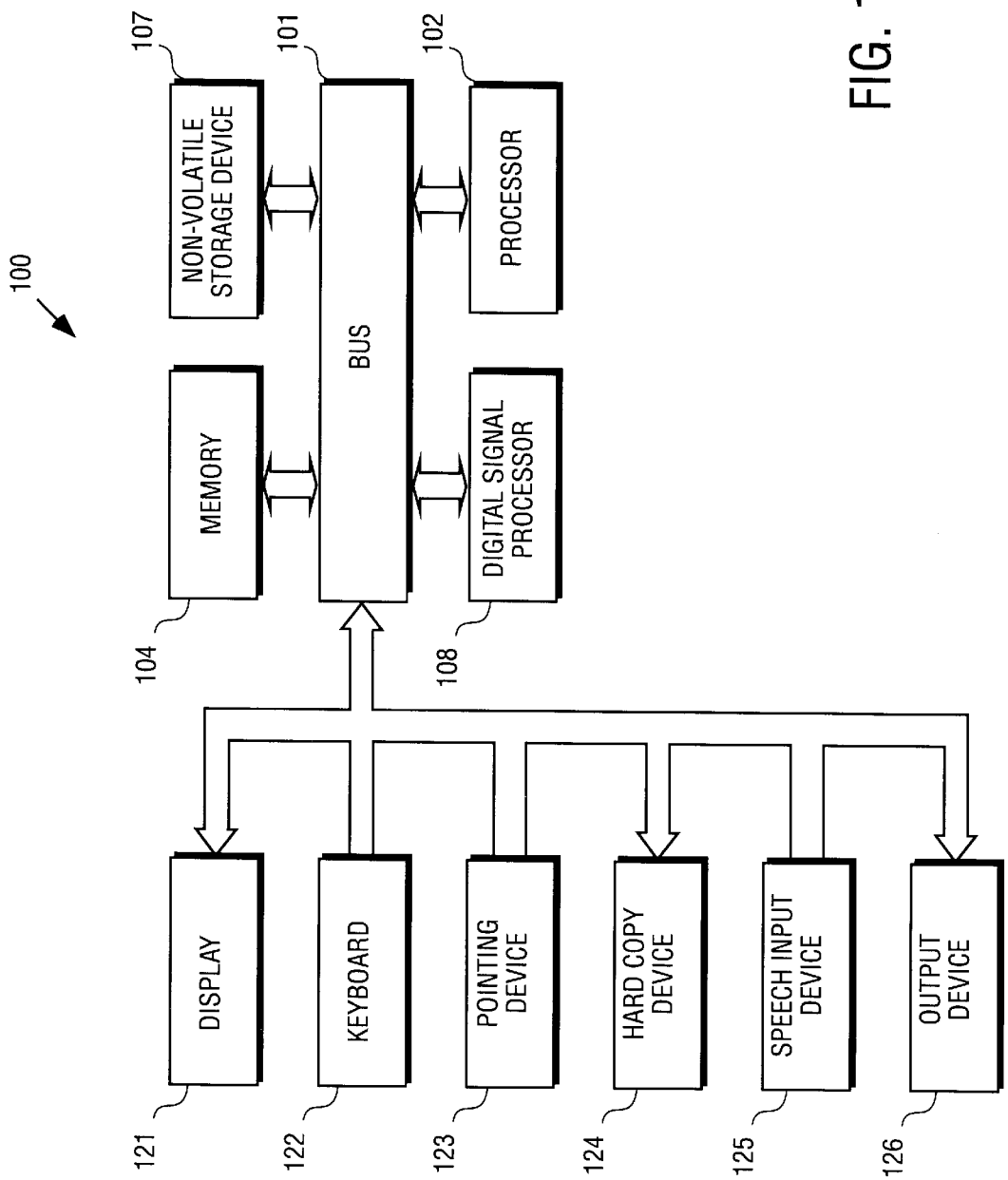
FIG. 1 is a block diagram of one embodiment of a computer hardware and operating environment suitable for practicing the present invention.

In the following detailed description of embodiments of the invention, reference is made to the accompanying drawings in which like references indicate similar elements, and in which is shown by way of illustration specific embodiments in which the invention may be practiced. Numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the present invention can be implemented in hard-wired circuitry, by programming a general purpose processor or by any combination of hardware and software. One of skill in the art will immediately appreciate that the invention can be practiced with computer system configurations other than those described below, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network. The required structure for a variety of these systems will appear from the description below.

The methods of the invention are described in terms of computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application . . . ), as taking an action or causing a result. Such expressions are merely a shorthand way of saying that execution of the software by a computer causes the processor of the computer to perform an action or a produce a result.

FIG. 1 is a block diagram of one embodiment for an architecture of a computer system 100. Referring to FIG. 1, computer system 100 includes system bus 101 that allows for communication among processor 102, digital signal processor 108, memory 104, and non-volatile storage device 107. System bus 101 may also receive inputs from keyboard 122, pointing device 123, and speech signal input device 125. System bus 101 provides outputs to display device 121, hard copy device 124, and output device 126 (such as, for example, an audio speaker). Memory 104 may include, for example, read only memory (ROM), random access memory (RAM), flash memory, or any combination of the above.

It will be appreciated that computer system 100 may be controlled by operating system software which includes a file management system, such as, for example, a disk operating system, which is part of the operating system software. The file management system may be stored in non-volatile storage device 107 and may be configured to cause processor 102 to execute the various functions required by the operating system to input and output data and to store data in memory 104 and on non-volatile storage device 107.

Figure 2A:
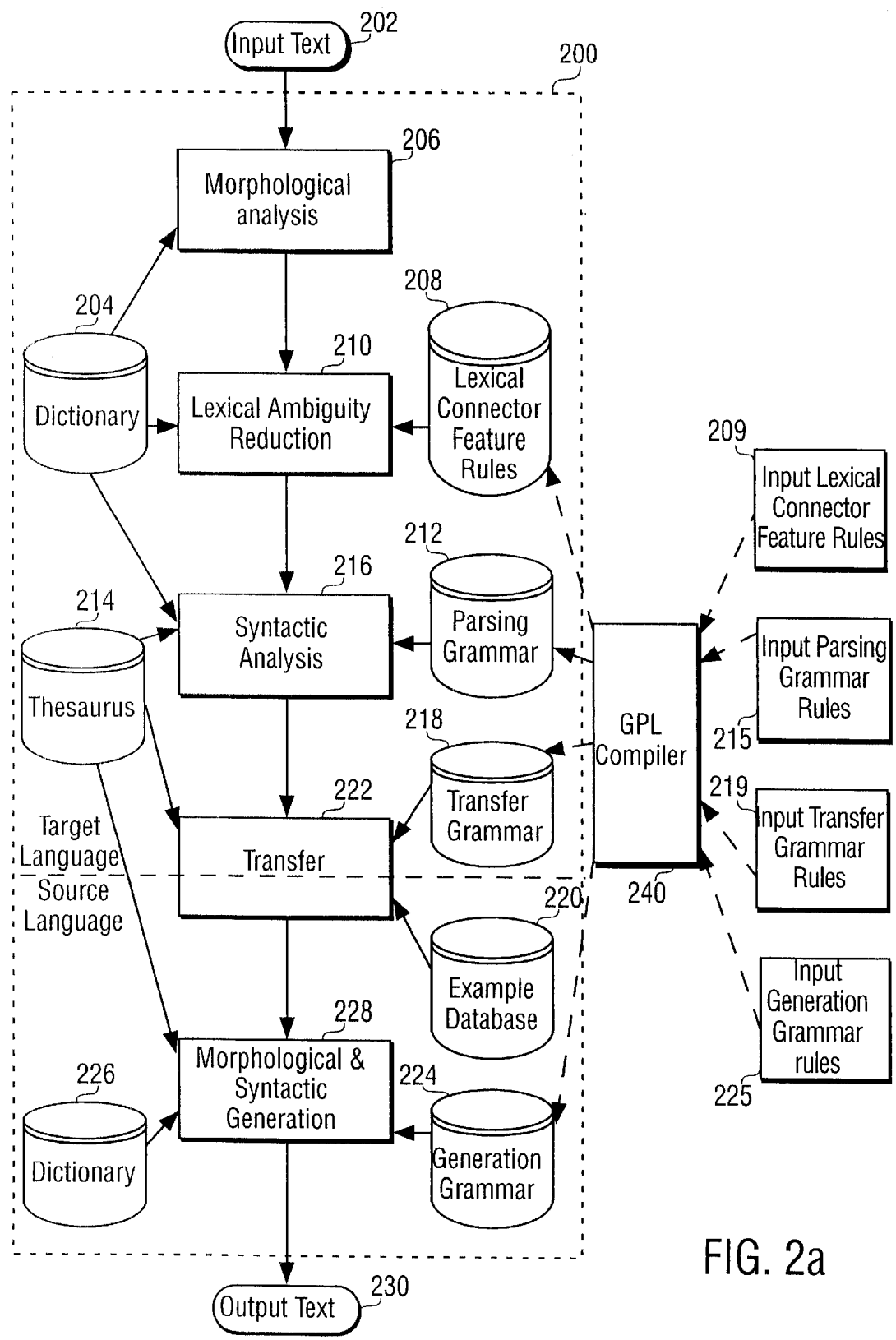
FIG. 2a is a block diagram of one embodiment of a natural language translation system that operates in the environment shown in FIG. 1.

FIG. 2a is a block diagram of one embodiment for a natural language translation system 200. Referring to FIG. 2a, natural language translation system 200 includes five modules, supporting databases, and associated grammars to quickly and accurately translate text between source and target languages. Input text may be directly input into natural language translation system 200 (for example, as with a person typing sentences into a computer using keyboard 122). Alternatively, input text to natural language translation system 200 may be the output of another system, such as, for example, output from a speech recognition system (for example, speech input device 125), or from an optical character recognition system (not shown).

An English sentence "He wants to go to the White House" is used throughout this section as example text input to describe the functioning of the system 200. The individual units in a sentence are referred to herein as "words" but the natural language translation system 200 is not limited to only word-based natural languages, having equal applicability to translation of character-based languages as well. Except where the differences in processing word-based and character-based languages are specified, the term "word" is intended to encompass both words and characters.

In the following description, a grammar is generally a set of context-free rules that define the valid phrase structures in the source or target language, with each context-free rule associated with one or more statements (the "rule body") that perform tests and manipulations on the linguistic representations (feature structures). Thus, an English sentence may be combined from a noun phase (NP) and a verb phrase (VP), but the subject and verb forms must agree, e.g., "He want to go to the White House" is a valid phrase structure but an improper English sentence. All rule bodies utilized by the grammars of language translation system 200 are in the form of computer-executable routines produced by defining the grammar in terms of a grammar programming language (GPL) and passing appropriate rule bodies (209, 215, 219, and 225) through a GPL compiler 240. The output of the GPL compiler 240 may be in the form of directly executable code, or may be in the form of standard computer programming language statements (such as, for example, C, C++, Pascal, or Lisp) which are then input into the corresponding programming language compiler to produce executable code. In either case, the compiled grammars include a specific function for each context-free rule. The specific function performs all the processing required by the rule and its associated rule body. Furthermore, the interfaces between the compiled grammars and the modules enable a single language translation system 200 to perform translation between multiple natural languages, and to perform more than one translation simultaneously.

A morphological analysis module 206 takes text input 202 and uses a source language dictionary 204 to decompose the words into morphemes by identifying root forms, grammatical categories, thesaurus information, and other lexical features of the words. The morphological analysis module 206 builds a "feature structure" for each word. Feature structures are well known in the art as linguistic data structures that contain feature-value pairs for strings, symbols, and numbers that appear in a natural language sentence. Each feature of a word is mapped to the appropriate value through a function commonly designated as:

word →[feature: value]

Thus, a simplified, exemplary representation of the feature structures for the words "he" and "wants" are as follows:

$$I \mapsto \begin{bmatrix} \text{root:he} \\ \text{cat:pronoun} \end{bmatrix} \quad \text{(Feature Structure 1)}$$

$$\text{wants} \mapsto \begin{bmatrix} \begin{bmatrix} \text{root:want} \\ \text{cat:noun} \end{bmatrix} \\ \text{OR} \\ \begin{bmatrix} \text{root:want} \\ \text{cat:verb} \end{bmatrix} \end{bmatrix} \quad \text{(Feature Structure 2)}$$

The Feature Structure 2 may be referred to as a "disjunctive" feature structure as it represents two mutually exclusive feature structures that are valid for the word.

It will be appreciated that the grammatical category is not the only feature of these two words and that morphological analysis module 206 outputs full feature structures. The example feature structures are simplified for the sake of clarity in explanation and are also frequently represented by a shorthand notation, e.g., [want] or NP[ ].

The feature structures built by morphological analysis module 206 are input into lexical ambiguity reduction module 210. In one embodiment, lexical ambiguity reduction module 210 may segment the words in character-based languages that do not utilize spaces through a database of lexical connector feature rules 208. Lexical connector feature rules 208 are created from GPL grammar statements as described above. Each possible combination of adjacent segmented words are assigned a lexical cost. Dictionary 204 defines combinations of words ("multiwords"). Lexical ambiguity reduction module 210 evaluates each feature structures that contains a part-of-speech (POS) ambiguity, such as the feature structure for the word "wants" which is tagged as both a noun and a verb. The various possible POS tags are assigned a lexical cost. Lexical ambiguity reduction module 210 weighs the cost assigned to each word in the sentence and selects those feature structures that have the lowest cost.

Figure 2B:
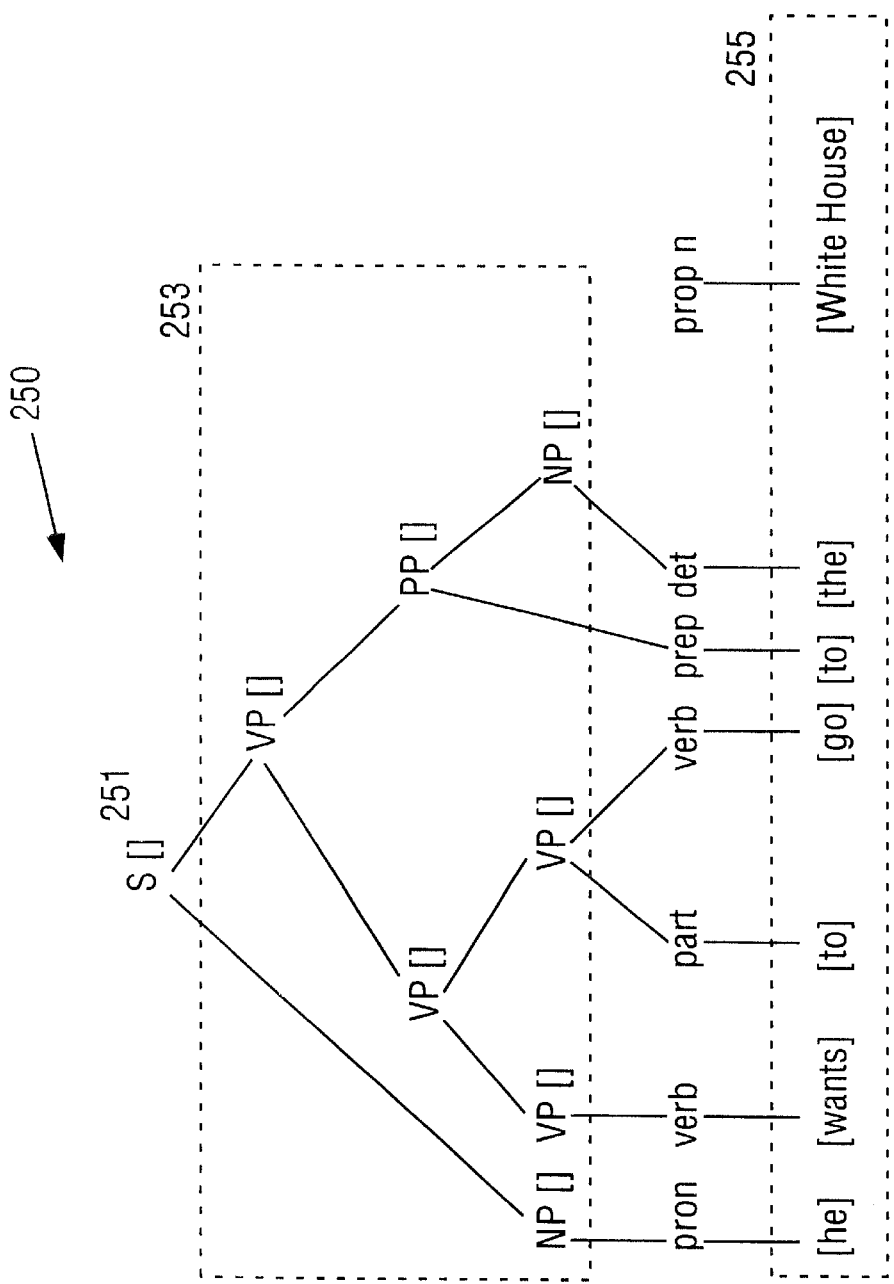

The feature structures chosen for the words by lexical ambiguity reduction module 210 are passed to syntactic analysis module 216. Syntactic analysis module 216 combines the chosen feature structures into a feature structure that represents the content of the input sentence. In one embodiment, syntactic analysis module 216 uses parsing grammar 212 to create a syntax parse tree for the sentence. Parsing grammar 212 contains the source language context-free grammar rules in the form of a parsing table and the associated rule bodies in executable code. Each leaf of the syntax parse tree is a feature structure for one of the words in the sentence. Once the leaves are created, an intermediate feature structure for each branch (parent) node in the syntax parse tree is built by combining its child nodes as specified in one or more of the context-free grammar rules. The rule body for each potentially applicable context-free grammar rule manipulates the various feature structures at the child nodes and determines whether the associated context-free rule could create a valid phrase from the possible combinations. A rule body may cause a thesaurus 214 to be queried as part of the manipulation. It will be appreciated that the feature structure that results from applying the context-free grammar rules may be nested (i.e., contain multiple feature structures from each child node). Syntactic analysis module 216 may create the syntax parse tree shown in FIG. 2b for the example sentence from its constituent feature structures, with the following feature structure at the top (root) of the syntax parse tree to represent the full sentence:

$$S \to \begin{bmatrix} \text{SUBJ "he"} \\ \text{VERB "wants to go"} \\ \text{OBJ "to the White House"} \end{bmatrix} \quad \text{(Feature Structure 3)}$$

It will be appreciated that both the syntax parse tree 250 and the Feature Structure 3 are not exact representations but are simplified for purposes of ease in explanation.

The feature structure for the sentence in the source language is passed to transfer module 222. The feature structure represents the analysis of the source input and may contain a number of nested linguistic representations (referred herein as sub-structures or slots). Transfer module 222 uses transfer grammar 218 to match source language slots of the input with source language slots in example database 220. Example database 220 contains feature structure pairs in the source language and a target language. For example, database 220 may contain matching feature structures in English and Japanese. Transfer grammar 218 consists of a set of rewrite rules with a context-free component and a GPL rule body. The context-free parts of the rules are used to create a transfer generation tree.

Figure 2C:
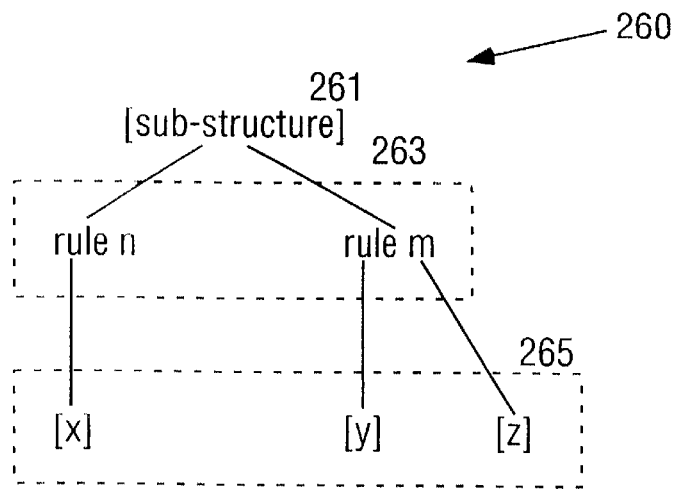

Transfer module 222 uses the GPL rule bodies within transfer grammar 218 to match the input source sub-structures or slots to the source sub-structures or slots in example database 220. If a good match is found (in one embodiment, a low overall match cost), transfer module 222 checks if all sub-structures or slots of the input feature structure have found a match. If a match for a sub-structure is not found, the sub-structure is used as input to transfer module 222. A transfer generation tree of the form shown in FIG. 2c is used to break the sub-structure into multiple sub-structures. The new input may be a part of the original, source feature structure or a new feature sub-structure that is constructed from sections of different slots.

Transfer module 222 uses the input feature structure (or sub-structure) in the source language as the starting symbol to build transfer generation tree 260. Root 261 is a symbol-node (s-node) and is labeled with the starting symbol of the feature structure. The transfer grammar determines which transfer grammar rules are applicable to the feature structure at the root 261, and creates child rule-node(s) (r-node) 263 depending from root 261. In one embodiment, r-nodes 263 are the rule numbers within transfer grammar 218 that may be validly applied to the input feature structure. Transfer grammar 218 rules added to tree 260 are applied to the s-nodes 265. If the application of each rule succeeds, a child rule-node (r-node) 265 is added to tree 260. If the application fails, the s-node 261 is tagged as "dead" for sub-sequent removal. Transfer grammar 218 then creates a new s-node 265 for each r-node 263. Again, the applicable rules are found for each s-node 265 and applied. The process is repeated until all sub-features within the feature structure have been expanded. Transfer generation tree 260 is then pruned to remove any "dead" nodes and corresponding sub-trees. If root 261 is tagged as "dead," the generation fails. Otherwise, the resulting transfer generation tree 260 is used by transfer module 222 to match the feature structure against the example database 220. The feature structures and sub-structures in the target language associated with a match are substituted for the corresponding feature structures and sub-structures matched in the source language. Transfer module 222 recursively applies the transfer rules contained within transfer grammar 218 from the top-most transfer rules until all meaningful sub-features or constituents within the input source feature structure are transferred to the target sub-structures. The transfer module 222 will consult the thesaurus 214 when required to do so by a transfer rule. Transfer module 222 outputs a feature structure in the target language.

Figure 2D:
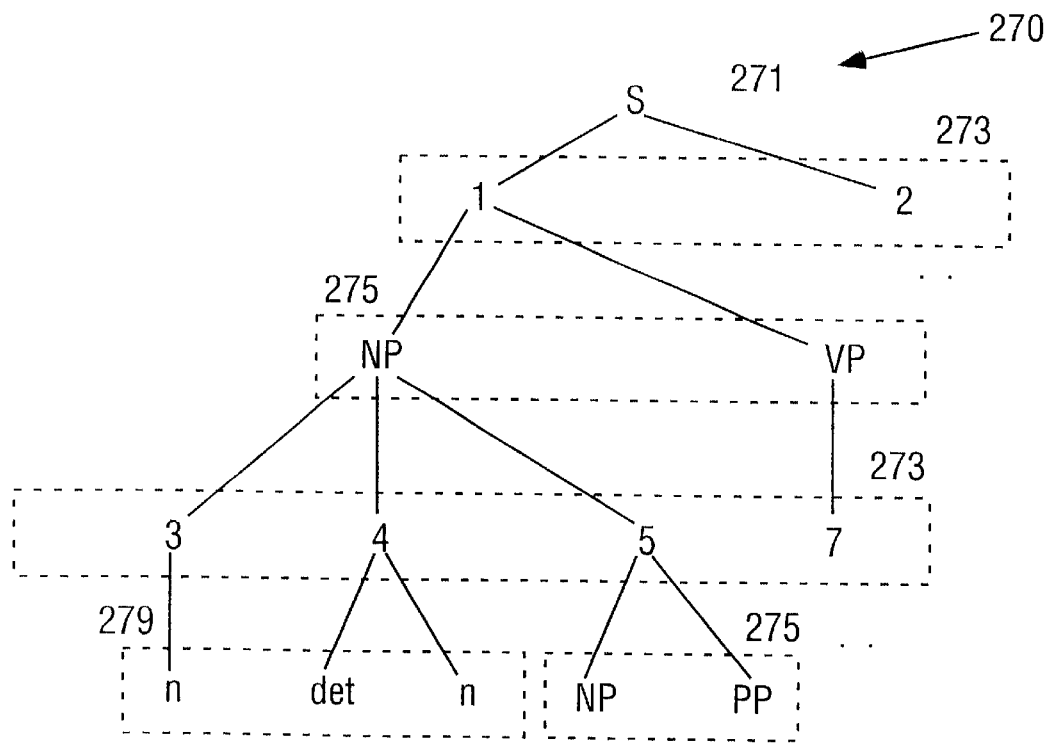

The feature structure for the sentence in the target language is passed to a morphological and syntactical generation module 228, where it is used as the root node for a syntactical generation tree, an example of which is shown in FIG. 2d. The syntactical generation tree is built in the same fashion as the transfer generation tree, with context-free rules in a generation grammar 224 as its r-nodes 273. The generation grammar 224 copies information to each s-node 275, 279. Unlike the transfer module 226, in which multiple sub-transfers created multiple transfer generation trees, only one syntactical generation tree is created by the morphological and syntactical generation module 228. Any s-node that is not a leaf node 279, i.e., associated with a feature structure for a word, is used to generate the next level of r-nodes. When all child s-nodes under an r-node are leaf nodes, the current branch of the tree is complete and the morphological and syntactical generation module 228 traverses back up the tree to find the next s-node that is not a leaf node. The thesaurus 214 is consulted when necessary during the generation of the tree. The transfer generation tree is complete when all the lowest level s-node are leaf nodes.

When the syntactical generation tree is complete, the leaf nodes contain output feature structures representing the words in one or more translations of the input sentence. The sequence of output feature structures that represents the best sentence is converted into output text 230 by the morphological and syntactical generation module 228 using the dictionary 226.

Alternatively, all output feature structures for all sentences may be converted into the output text 230.

The syntactic analysis module 215, transfer module 222, and morphological and syntactical generation module 228 are language-neutral in that they are driven by language-specific grammars to translate between the specified languages so that no knowledge about the languages need be incorporated into the modules themselves. Similarly, no knowledge about the functioning of the modules is required in the natural language grammar rules.

A system level overview of the operation of an embodiment of the natural language translation system has been described above. The natural language translation system utilizes various modules, grammars and databases to translate between multiple languages simultaneously. While the invention is not limited to any particular arrangement of modules, grammars and database, for sake of clarity a single configuration has been illustrated and described.

One embodiment of the GPL compiler 240 in FIG. 2a is described next with reference to FIGS. 3–6. As described above, the grammars used to control the processing of the language-neutral modules in the natural language translation system 200 are generally made up context-free rules and associated rule bodies, with each rule body being a block of GPL statements. The GPL statements specify operations to be performed on the feature structures that represent natural language expressions. The GPL is described by a lexicon that defines the recognized symbols, strings, numbers, operators, fixed key words, variable names, etc. for the GPL, and a syntax that defines the correct formats for a GPL statement.

Figure 3:
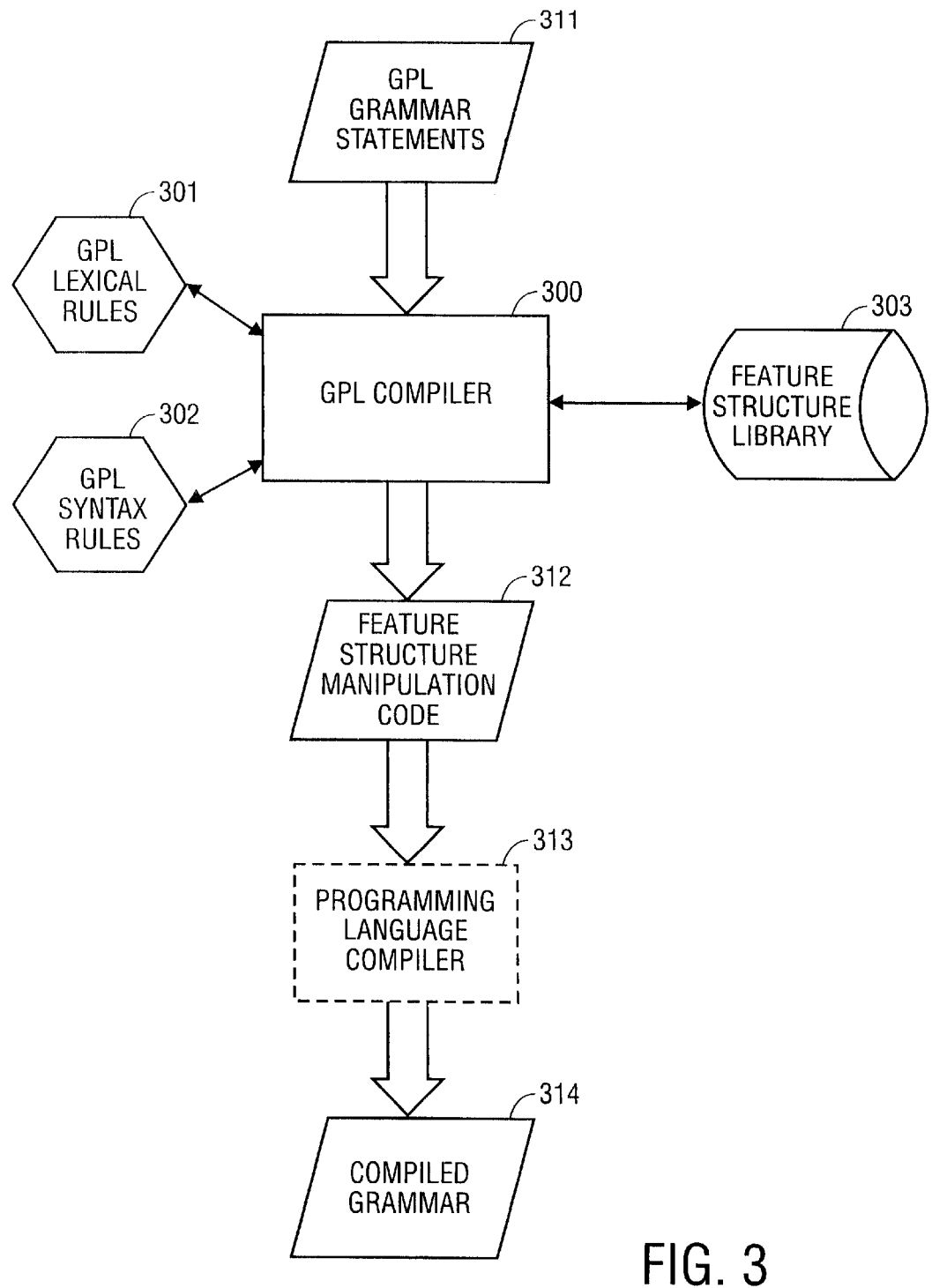

FIG. 3 is a diagram of one embodiment of a compilation process to create grammars suitable for use in the natural language translation system 200. The GPL compiler 300 takes as input the GPL statements 311 defining a natural language grammar rule body, uses lexical rules 301 to identify the GPL lexical tokens in the GPL statements, syntax rules 302 to parse the tokens into a syntactically valid data construct that represents each GPL statement, and a feature structure library 303 to map each feature structure operation in the GPL statements to a library routine that performs the required manipulation of the feature structure. Each feature structure manipulation function 312 output from the GPL compiler for a rule body contains calls to the mapped feature structure library routines along with additional necessary code, such as standard library function calls and control structures.

In the present embodiment, the feature structure manipulation functions 312 are in the form of source code instructions in a standard compiled computer programming language, such as C or C++, which are then passed into the corresponding compiler 313 to produce object code for the compiled grammar 314 utilized by the natural language translation system. In an alternate embodiment, the feature structure manipulation routines 312 are in the form of instructions in an interpreted language, such as Lisp, which are then interpreted at run-time to function in the same fashion as the compiled grammars in the natural language translation system. In still another embodiment, the GPL compiler 300 outputs feature structure manipulation routines 312 as object code to be used as the compiled grammars.

The lexical rules 301 and the syntax rules 302 are sets of context-free rules that define the GPL and control the functions of the GPL compiler 300, in the same fashion as the natural language grammars control the functions of the language-neutral modules of system 200. The lexical and syntax rules are referred to herein as "GPL compiler rules" to distinguish them from the context-free rules that define a natural language or "application" grammar. Each of the GPL compiler rules is also associated with a rule body that specifies the semantic actions to be performed when the rule is successfully applied to the input GPL statements. In one embodiment, the GPL compiler 300 is created by inputting the lexical rules 304 into the Unix tool "lex" to generate a lexical analyzer and the syntax rules 305 into the Unix tool "yacc" to generate a syntactical analyzer in the form of a LR parser. One of skill in the art will immediately recognize that different compiler generation tools can be used to create the GPL compiler 300, or that the GPL compiler can be coded directly, without departing from the scope of the invention.

Figure 4:
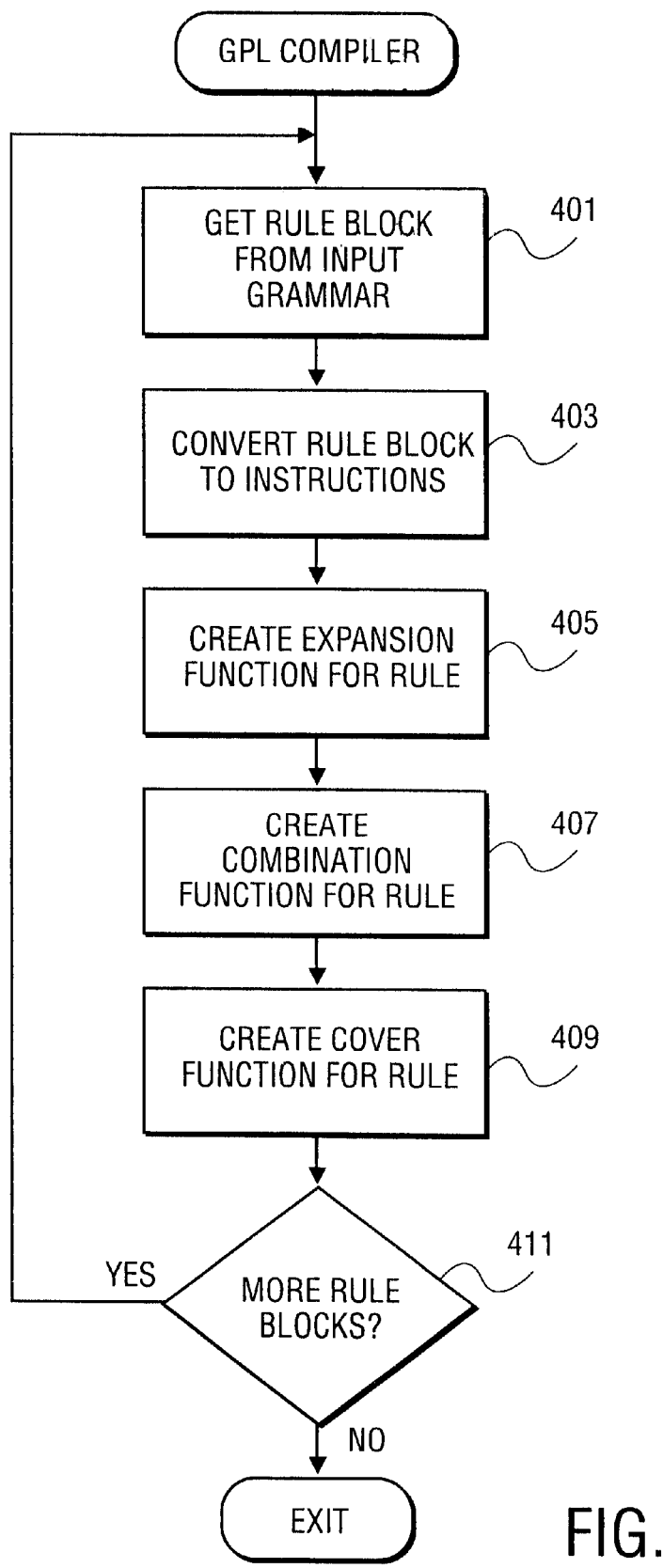
FIG. 4 is a flowchart of one embodiment of a method for a compiler shown in FIG. 3.

FIG. 4 is a flowchart for a one embodiment of a method performed by a computer when executing the embodiment of the GPL compiler 300 shown in FIG. 3. The methods to be performed by the computer constitute computer programs made up of computer-executable instructions. Describing the methods by reference to a flowchart enables one skilled in the art to develop such programs including such instructions to carry out the methods on suitable computers (the processor of the computers executing the instructions from computer-readable media). A particular embodiment of the GPL compiler method includes all the acts from 401 until 411 shown in FIG. 4.

Figure 5:
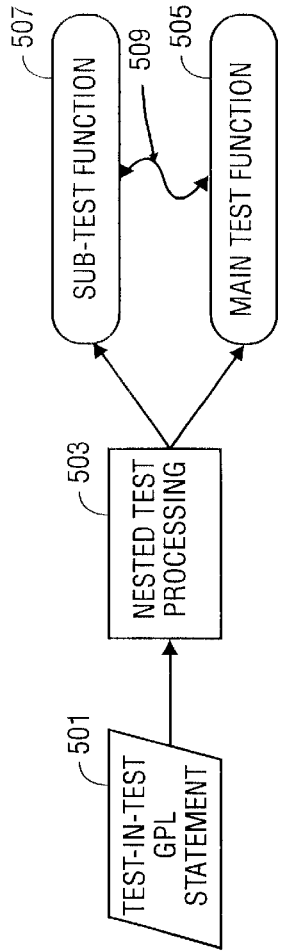
FIG. 5 is a diagram of one embodiment of functions created by the method of FIG. 4.

The GPL compiler method 400 examines the rule body for each rule in turn (blocks 401 and 411). It converts the GPL statements that make up the rule body into instructions for a feature structure manipulation function using the lexical and syntactical analysis described above (block 403). In an embodiment illustrated in FIG. 5, block 403 creates two functions from a GPL statement that is nested within another GPL statement: a main, or outer, test function 505 for the original statement, and a sub-test, or inner, test function 507 for the statement that is nested within the original statement. A pointer 509 to the sub-test function 507 is specified as an argument to the main test function 505. When the main test function 505 is executed, it will call the sub-test function 507 to perform the nested test, with the results being passed back to the main test function 505 for further evaluation. It will be appreciated that while only a single level of nesting is shown in FIG. 5 for purposes of clarity, the handling of GPL statements containing multiple levels of nesting using the same methodology are contemplated as being within the scope of the invention.

The grammars for the natural language translation system use disjunctive feature structures, such as shown in the example feature structure 2 above, to represent ambiguous natural language expressions. The GPL compiler method 400 creates an expansion function (block 405) and a combination function (block 407) to handle the processing of disjunctive feature structures for each natural language grammar rule. The expansion function creates a set of expanded feature structures that represent all combinations of features structures represented by the disjunctive feature structure. In an alternate embodiment, the expansion function performs a selective expansion based on whether a feature in the feature structure is referenced by the grammar rule, thus creating a subset of all the combinations under certain circumstances. The combination function creates a single disjunctive feature structure from a set of mutually exclusive feature structures.

For each grammar rule, the embodiment of the GPL compiler method 400 shown in FIG. 4 also creates a "cover" function (block 409) that is called by the language-neutral modules of the natural language translation system whenever the corresponding application grammar rule is applicable to a feature structure. The cover function contains a call to the feature structure manipulation function generated for the rule body at block 403, and calls to the expansion and combination functions generated for the rule at blocks 405 and 407. One of skill in the art will immediately recognize that the set of cover functions generated for an application grammar may be stored in non-volatile storage for later application, and that each of the cover functions is addressed by an identifier, such as a rule number, that is unique within the grammar set.

Figure 6:
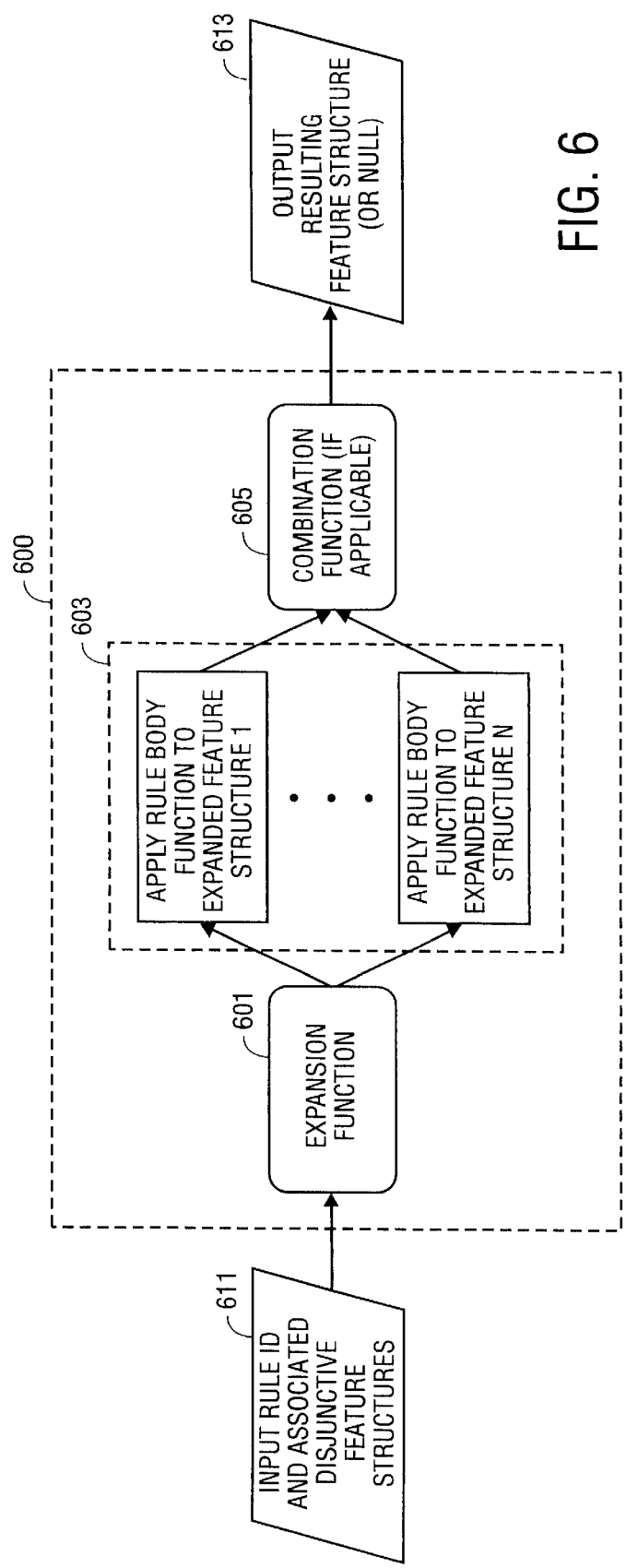
FIG. 6 is a diagram of processing performed by functions created by the method of FIG. 4.

As shown in FIG. 6, when an application grammar rule is invoked by a language-neutral module on one or more disjunctive feature structures associated with the rule 611, the cover function for the rule 600 calls the compiled expansion function 601 to create the expanded feature structures from the disjunctive feature structures, calls the compiled function for the rule body 603 to manipulate each of the expanded feature structures in parallel, and calls the compiled combination function 605 to combine the resulting feature structures into a single output feature structure 613. If the rule cannot be successfully applied against any of the expanded feature structures, the combination function 605 cannot be performed and "null" is output to indicate the failure. Thus, the cover functions generated by the present embodiment of the GPL compiler method 400 form the interface between the language-neutral modules of the system and the compiled grammar rules.

In an alternate embodiment, the cover function is created without calls to the expansion or combination functions, and the compiled rule body function manipulates only the single input feature structure. In a further embodiment, cover functions that have a like number of input arguments are addressed through a common function that specifies the arguments and a rule identifier as input variables.

A GPL compiler suitable for compiling the grammars employed in a natural language translation system has been described. The GPL compiler enables a flexible programming language for creating natural language grammars because it hides much of the complexities of manipulating feature structures that represent natural language expression. In one aspect, the GPL compiler handles nested GPL statements, allowing the programmer to easily create multi-layered operations with the GPL. In another aspect, the GPL compiler enables a single interface between a grammar rule and a language-neutral module that wants to apply the rule to a natural language expression. Because the GPL compiler generates expansion and combination functions for each rule, the programmer does not have to be concerned with determining when a rule can be applied to a disjunctive feature structure, making the task of creating a grammar simpler. Furthermore, because a disjunctive feature structure is expanded only once during the execution of the rule, and rule is applied in parallel to each expanded feature structure, the GPL compiler provides for more efficient and faster natural language processing. The translation of a natural language is also enhanced when the grammars used are in the form object code statements that can be directly executed by a computer processor.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Furthermore, the terminology used in this application with respect to the operating and computer programming environments is meant to include all environments that provide the features required to implement a GPL compiler for a natural language translation system.

Therefore, it is manifestly intended that this invention be limited only by the following claims and equivalents thereof.

What is claimed is:

1. A method of compiling natural language grammar rules into separate functions comprising:
   determining a set of operations that manipulate a representation of a natural language expression for each rule, wherein the representation is a disjunctive feature structure;
   generating an expansion function to build an expanded feature structure for a combination represented by the disjunctive feature structure;
   generating a combination function to create a new disjunctive feature structure from a resulting feature structure created by applying the rule to the expanded feature structure;
   mapping each operation in the set to a corresponding library function; and
   creating an interface function containing the mapped library functions from the expansion function and the combination function, wherein the interface function is executed when the corresponding rule is invoked.

2. The method of claim 1, wherein the interface function contains computer programming language source code, the method further comprising:
   inputting the interface function to a corresponding computer programming language compiler; and
   executing object code output from the compiler when the rule is invoked.

3. The method of claim 1, further comprising:
   addressing each interface function using an identifier for the corresponding rule.

4. The method of claim 3, further comprising:
   creating a common interface function for all interface functions having a like number of input arguments, wherein a particular rule is invoked by specifying the identifier for the rule to the common interface function.

5. The method of claim 1, wherein the natural language grammar rules are defined by a compiler grammar and wherein determining the set of operations comprises:
   analyzing the rule according to the compiler grammar.

6. The method of claim 1, wherein each natural language grammar rule comprises a context-free rule and an associated rule body and the set of operations is specified by the associated rule body.

7. A method of compiling natural language grammar rules into separate functions comprising:
   determining a set of operations that manipulate a representation of a natural language expression for each rule;
   mapping each operation in the set to a corresponding library function;
   recognizing a nested operation, wherein a nested operation comprises an inner operation nested within an outer operation;
   mapping a separate library function to each of the outer and inner operations;
   generating a pointer to the library function mapped to the inner operation;
   specifying the pointer as an argument for the library function mapped to the outer operation; and
   creating an interface function containing the mapped library functions, wherein the interface function is executed when the corresponding rule is invoked.

8. The method of claim 7, wherein mapping a separate library function, generating a pointer, and specifying the pointer are repeated for each inner operation that is recognized as a nested operation.

9. The method of claim 7, further comprising:
   addressing each interface function using an identifier for the corresponding rule.

10. The Method of claim 9, further comprising:
    creating a common interface function for all interface functions having a like number of input arguments, wherein a particular rule is invoked by specifying the identifier for the rule to the common interface function.

11. A computer-readable medium having stored thereon executable instructions to cause a computer to perform a method of compiling natural language grammar rules into separate functions, the method comprising:
    determining a set of operations that manipulate a representation of a natural language expression for each rule, wherein the representation is a disjunctive feature structure;
    generating an expansion function to build an expanded feature structure for a combination represented by the disjunctive feature structure;
    generating a combination function to create a new disjunctive feature structure from a resulting feature structure created by applying the rule to the expanded feature structure;
    mapping each operation in the set to a corresponding library function; and
    creating an interface function containing the mapped library functions from the expansion function and the combination function, wherein the interface function is executed when the corresponding rule is invoked.

12. The computer-readable medium of claim 11, wherein the interface function contains computer programming language source code, and further comprising:
    inputting the interface function to a corresponding computer programming language compiler; and
    executing object code output from the compiler when the rule is invoked.

13. The computer-readable medium of claim 11, further comprising:
    addressing each interface function using an identifier for the corresponding rule.

14. The computer-readable medium of claim 13, further comprising:
    creating a common interface function for all interface functions having a like number of input arguments, wherein a particular rule is invoked by specifying the identifier for the rule to the common interface function.

15. The computer-readable medium of claim 11, wherein the natural language grammar rules are defined by a compiler grammar and wherein determining the set of operations comprises:

analyzing the rule according to the compiler grammar.

16. The computer-readable medium of claim 11, wherein each natural language grammar rule comprises a context-free rule and an associated rule body and the set of operations is specified by the associated rule body.

17. A computer-readable medium having stored thereon executable instructions to cause a computer to perform a method of compiling natural language grammar rules into separate functions, the method comprising:

determining a set of operations that manipulate a representation of a natural language expression for each rule;

mapping each operation in the set to a corresponding library function;

recognizing a nested operation, wherein a nested operation comprises an inner operation nested within an outer operation;

mapping a separate library function to each of the outer and inner operations;

generating a pointer to the library function mapped to the inner operation;

specifying the pointer as an argument for the library function mapped to the outer operation; and creating an interface function containing the mapped library functions, wherein the interface function is executed when the corresponding rule is invoked.

18. The computer-readable medium of claim 17, wherein mapping a separate library function, generating a pointer, and specifying the pointer are repeated for each inner operation that is recognized as a nested operation.

19. The computer-readable medium of claim 17, further comprising: addressing each interface function using an identifier for the corresponding rule.

20. The computer-readable medium of claim 19, further comprising:

creating a common interface function for all interface functions having a like number of input argument, wherein a particular rule is invoked by specifying the identifier for the rule to the common interface function.

21. A system for compiling natural language grammar rules into separate functions comprising:

a processing unit;

a memory coupled to the processing unit through a system bus;

a computer-readable medium coupled to the processing unit through the system bus; and a grammar programming language compiler executed from the computer-readable medium by the processing unit to cause the processing unit to create an interface function for each rule by determining a set of operations that manipulate a representation of a natural language expression for each rule, wherein the representation is a disjunctive feature structure, generating an expansion function to build an expanded feature structure for a combination represented by the disjunctive feature structure, generating a combination function to create a new disjunctive feature structure from a resulting feature structure created by applying the rule to the expanded feature structure, and mapping each operation in the set to a corresponding library function, wherein the interface function is executed when the corresponding rule is invoked.

22. The system of claim 21, wherein the interface function contains computer programming language source code and further comprising a computer programming language compiler executed from the computer-readable medium by the processing unit to cause the computer programming language compiler to generate object code from the interface function, wherein the object code is executed when the rule is invoked.

23. The method of claim 21, the grammar programming language compiler further causing the processing unit to assign an identifier to each rule, the identifier operable to address the corresponding interface function.

24. The system of claim 23, the grammar programming language compiler further causing the processing unit to create a common interface function for all interface functions having a like number of input arguments, wherein a particular rule is invoked by specifying the identifier for the rule to the common interface function.

25. The system of claim 21, wherein the natural language grammar rules are defined by a compiler grammar and the grammar programming language compiler further cause the processing unit to determine the set of operations for a rule by analyzing the rule according to the compiler grammar.

26. The system of claim 21, wherein each natural language grammar rule comprises a context-free rule and an associated rule body and the grammar programming language compiler causes the processing unit to determine the set of operations for a rule as specified by the associated rule body.

27. A system for compiling natural language grammar rules into separate functions comprising:

a processing unit;

a memory coupled to the processing unit through a system bus;

a computer-readable medium coupled to the processing unit through the system bus; and a grammar programming language compiler executed from the compute-readable medium by the processing unit to cause the processing unit to create an interface function for each rule by determining a set of operations that manipulate a representation of a natural language expression for each rule, mapping each operation in the set to a corresponding library function, recognizing a nested operation, a nested operation comprising an inner operation nested within an outer operation, and processing the nested operation by mapping a separate library function to each of the outer and inner operations, generating a pointer to the library function mapped to the inner operation, and specifying the pointer as an argument for the library function mapped to the outer operation, wherein the interface function is executed when the corresponding rule is invoked.

28. The system of claim 27, the grammar programming language compiler further causes the processing unit to repeat the processing for a nested operation for each inner operation it recognizes as a nested operation.

29. The method of claim 27, the grammar programming language compiler further causing the processing unit to assign an identifier to each rule, the identifier operable to address the corresponding interface function.

30. The system of claim 29, the grammar programming language compiler further causing the processing unit to create a common interface function for all interface functions having a like number of input arguments, wherein a particular rule is invoked by specifying the identifier for the rule to the common interface function.

* * * * *